(12) United States Patent
Fujimori et al.

(10) Patent No.: US 7,856,093 B2
(45) Date of Patent: Dec. 21, 2010

(54) INTERACTIVE COMMUNICATION APPARATUS AND CONNECTING METHOD

(75) Inventors: Takahiro Fujimori, Tokyo (JP); Yukiko Onodera, Kanagawa (JP); Tatsuya Hama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1217 days.

(21) Appl. No.: 11/472,357

(22) Filed: Jun. 22, 2006

(65) Prior Publication Data

US 2007/0070186 A1    Mar. 29, 2007

(30) Foreign Application Priority Data

Jun. 30, 2005   (JP) .............................. 2005-192733

(51) Int. Cl.
 *H04M 3/42* (2006.01)
(52) U.S. Cl. .............................. 379/201.01; 379/207.12
(58) Field of Classification Search ................. 379/201, 379/201.01, 207.12; 348/14.16, 584; 725/133
See application file for complete search history.

(56) References Cited

U.S. PATENT DOCUMENTS

| | | | | |
|---|---|---|---|---|
| 6,075,571 | A * | 6/2000 | Kuthyar et al. | 348/584 |
| 6,466,250 | B1 * | 10/2002 | Hein et al. | 348/14.16 |
| 2005/0028221 | A1 * | 2/2005 | Liu et al. | 725/133 |

FOREIGN PATENT DOCUMENTS

| | | |
|---|---|---|
| JP | 58-30268 | 2/1983 |
| JP | 63-305285 | 12/1988 |
| JP | 3-21146 | 1/1991 |
| JP | 5-164857 | 6/1993 |
| JP | 5-336276 | 12/1993 |
| JP | 7-27881 | 1/1995 |
| JP | 9-214923 | 8/1997 |
| JP | 2002-300548 | 10/2002 |
| JP | 2003-121162 | 4/2003 |
| JP | 2003-132036 | 5/2003 |
| JP | 2005-6290 | 1/2005 |

* cited by examiner

*Primary Examiner*—Thjuan K Addy
(74) *Attorney, Agent, or Firm*—Oblon, Spivak, McClelland, Maier & Neustadt, L.L.P.

(57) ABSTRACT

An interactive communication apparatus has a video signal, obtained by an image pickup device performing an image pickup activity, and which has the obtained video signal sent to another apparatus through a communication device while causing a display device to display an image based on a video signal received from the other apparatus through the communication device. The apparatus includes a storage device storing communicating party information about a communicating party at the other apparatus, the communicating party information including geographical location information and access point information about the communicating party. The apparatus also includes a graphic user interface generating a graphic user interface screen in order to have the display device display the generated screen by mapping an identification image identifying the communicating party onto a map based on the communicating party information in such a manner as to indicate a local time applicable to the communicating party.

16 Claims, 8 Drawing Sheets

TRANSMISSION POP-UP IMAGE

INTERACTIVE COMMUNICATION APPARATUS

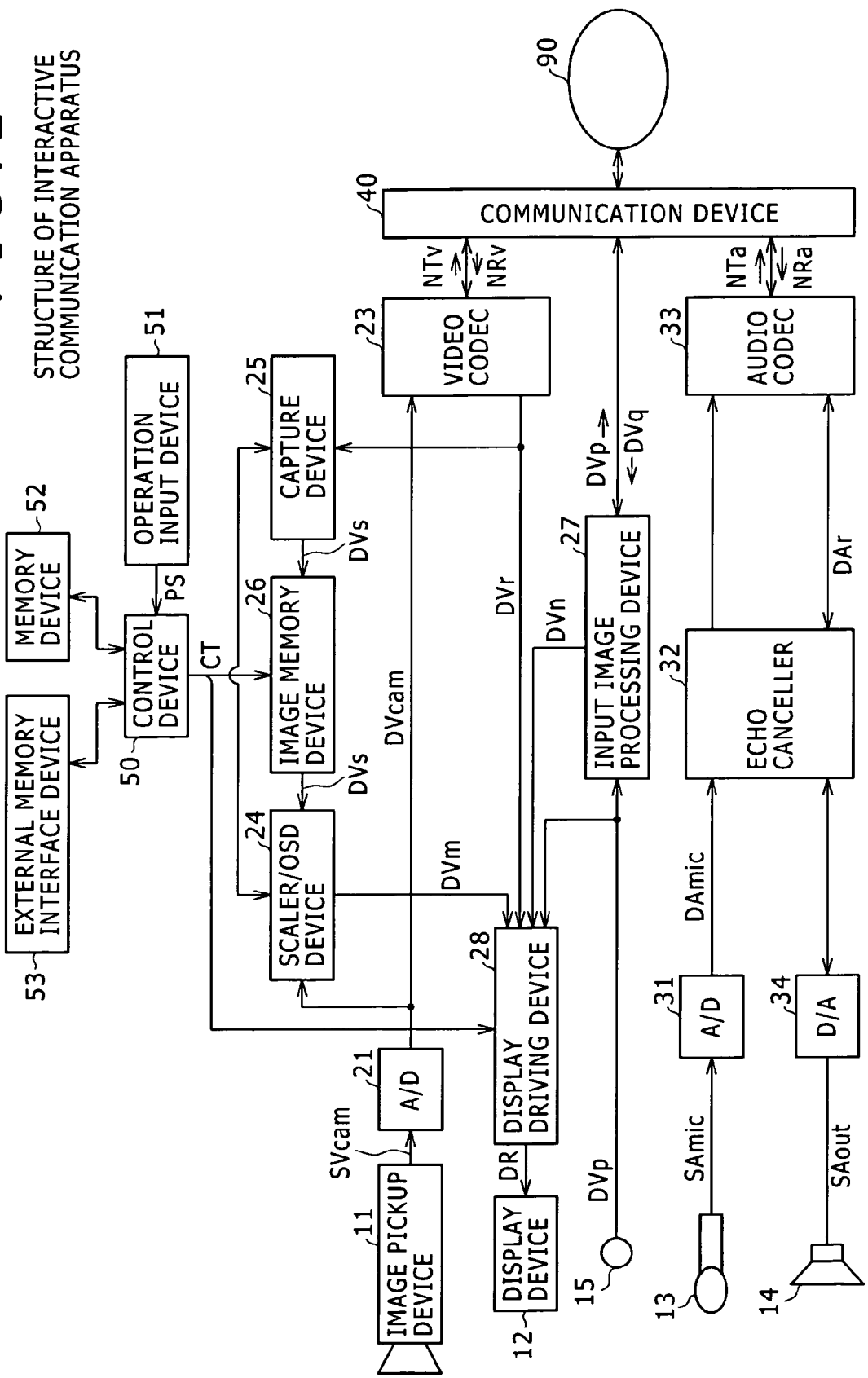

FIG. 3

INFORMATION ABOUT COMMUNICATING PARTIES

| PARTIES' NAMES | ACCESS POINT INFORMATION | GEOGRAPHICAL LOCATION INFORMATION | TIME INFORMATION | TIME CORRECTION INFORMATION | STORAGE LOCATION INFORMATION | LAYERED DISPLAY INFORMATION |
|---|---|---|---|---|---|---|
| Tarou | 81-3-**- 192:******** | JAPAN Tokyo | +9 | — | 00003 *h | ASE (*,*) JP1 (*,*) |
| Bob | 1-212-*-** 12:************ | USA NewYork | −5 | First Sunday in April~ Last Sunday in October | 00006 ***h | NAE (*,*) NW2 (*,*) |
| Mary | 44-**-*** 194:******** | UK London | 0 | Last Sunday in March~ Last Sunday in October | 00009 *h | ERW (*,*) GB1 (*,*) |
| Jane | 1-213-*-** 12:************ | USA LosAngels | −8 | First Sunday in April~ Last Sunday in October | 0000c ***h | NAW (*,*) CA1 (*,*) |
| Chen | 86-10-**- 219:******** | CHINA Beijing | +8 | — | 0000f *h | ASE (*,*) CH1 (*,*) |
| ......... | | | | | | |

TOP SCREEN

GROUPED DISPLAYS

SCALED-UP DISPLAY

TRANSMISSION POP-UP IMAGE

US 7,856,093 B2

INTERACTIVE COMMUNICATION APPARATUS AND CONNECTING METHOD

CROSS REFERENCES TO RELATED APPLICATIONS

The embodiment of the present invention contains subject matter related to Japanese Patent Application JP 2005-192733 filed with the Japanese Patent Office on Jun. 30, 2005, the entire contents of which being incorporated herein by reference.

BACKGROUND OF THE INVENTION

1. Field of the Invention

The present invention relates to an interactive communication apparatus and a connecting method illustratively for use with a videoconferencing system. More particularly, the present invention relates to an interactive communication apparatus and a connecting method for mapping, on a graphic user interface screen for each of two communicating parties, an identification image identifying the other communicating party onto a map showing the other party's geographical location in such a manner as to indicate the local time applicable to the other party, whereby the connection between the two parties is facilitated.

2. Description of the Related Art

Recent years have witnessed widespread acceptance of interactive communication systems such as videoconferencing systems whereby images picked up at two remote locations are sent bidirectionally over a network for display-based interactive communication, each of the two communicating parties watching the image of the other party while communicating with one another.

A typical videoconferencing system (e.g., see Japanese Patent Laid-open No. 2001-331429) utilizes a graphic user interface that displays, before the start of a videoconference, icons showing personal information about one party (in a first conference room) and the other party (in a second conference room), as well as icons showing the equipment set up in the first and the second conference rooms.

SUMMARY OF THE INVENTION

The above-cited patent application describes examples in which two locations represented by the first and the second conference rooms are interconnected for a videoconference. In many cases, however, numerous networked locations (e.g., a corporation's head office and its branches at home and abroad) are each furnished with videoconferencing equipment so that any two of these locations may communicate with each other by holding a videoconference.

When videoconferencing equipment is set up in each of many locations, the equipment at each location typically stores beforehand the other communicating parties' names, access point information (e.g., telephone numbers and IP addresses) and other relevant information in an address book held in a memory. At the beginning of a videoconference, the party at each location may open the address book to look up the other party and perform necessary operations to establish connection with that party over the network.

In practice, however, it is not very easy to open the address book and look up any given party for a videoconference. In addition, where terminals of the videoconference equipment are set up at home and abroad, simply calling up a desired party from the address book can initiate a videoconference at an inconvenient time for the other party because of time-zone differences.

the embodiment of the present invention has been made in view of the above circumstances and provides an interactive communication apparatus and a connecting method for facilitating a communicating party's connection with the other party in an interactive communication.

In carrying out the embodiment of the present invention and according to one embodiment thereof, there is provided an interactive communication apparatus for having a video signal obtained by an image pickup device performing an image pickup activity and for having the obtained video signal sent to another apparatus through a communication device while causing a display device to display an image based on a video signal received from the other apparatus through the communication device, the interactive communication apparatus including: a storage device configured to store communicating party information about a communicating party at the other apparatus, the communicating party information including geographical location information and access point information about the communicating party; and a graphic user interface configured to generate a graphic user interface screen in order to have the display device display the generated screen by mapping an identification image identifying the communicating party onto a map based on the communicating party information in such a manner as to indicate a local time applicable to the communicating party. Preferably, the communicating party information may include information about the local time of the communicating party, and the graphic user interface may cause the local time of the communicating party to be included in the identification image. The graphic user interface may preferably display time information onto the map and vary display brightness and/or display colors on the map depending on the time information. Preferably, the graphic user interface may provide a layered structure of graphic user interface screens each having a different scale of said map. Preferably, if the identification image mapped on the map is selected, then the graphic user interface may start communication using the access point information about the communicating party corresponding to the selected identification image.

According to another embodiment of the present invention, there is provided a connecting method for use with an interactive communication apparatus which has a video signal obtained by an image pickup device performing an image pickup activity and which has the obtained video signal sent to another apparatus through a communication device while causing a display device to display an image based on a video signal received from the other apparatus through the communication device, the interactive communication apparatus including a graphic user interface and a storage device configured to store communicating party information about a communicating party at the other apparatus, the communicating party information including geographical location and access point information about the communicating party, the connecting method causing the graphic user interface to carry out a procedure including the steps of: generating a graphic user interface screen in order to have the display device display the generated screen by mapping an identification image identifying the communicating party onto a map based on the communicating party information in such a manner as to indicate a local time applicable to the communicating party; and if the identification image mapped on the map is selected, then starting communication using the access point information about the communicating party corresponding to the selected identification image.

According to the embodiment of the present invention, as outlined above, the graphic user interface screen is generated by mapping the identification information identifying the communicating party to a relevant location on the map based on the communicating party information in such a manner as to indicate the local time applicable to the communicating party. The GUI screen permits easy verification of the geographic location and local time applicable to the communicating party and thereby improves convenience in establishing connection with the communicating party.

BRIEF DESCRIPTION OF THE DRAWINGS

FIG. 2 is a block diagram showing a structure of the interactive communication apparatus;

FIG. 3 is a tabular view showing information about communicating parties;

DETAILED DESCRIPTION OF THE PREFERRED EMBODIMENTS

Figure 1:
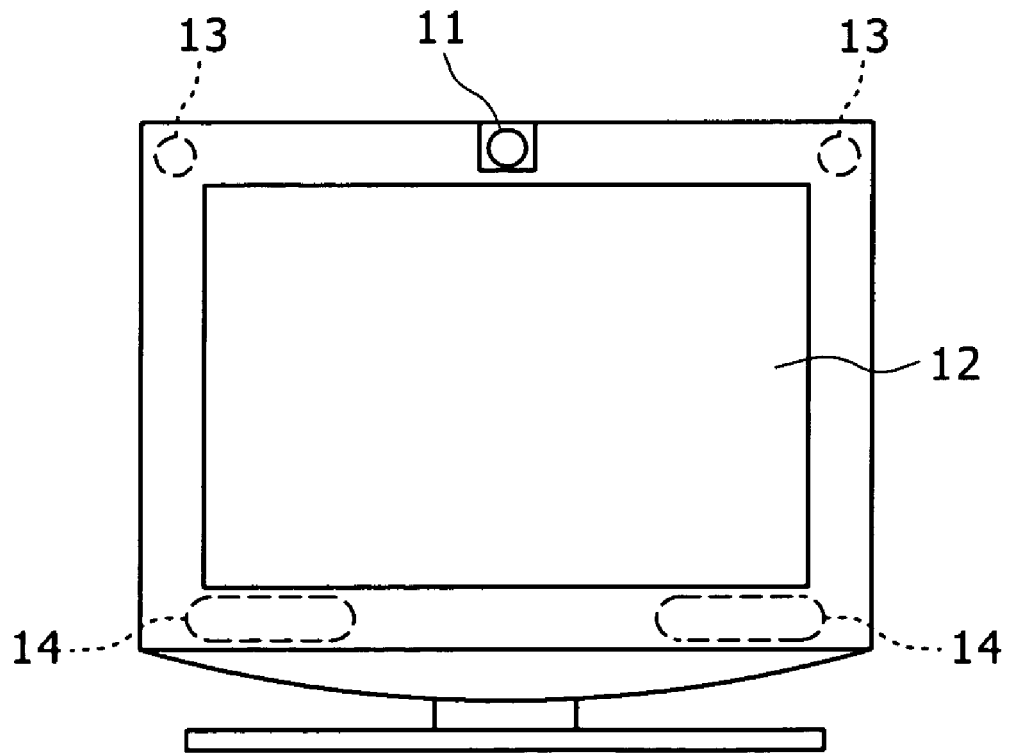
FIG. 1 is a front view of an interactive communication apparatus.

A preferred embodiment of the present invention will now be described with reference to the accompanying drawings. FIG. 1 is a front view of an interactive communication apparatus 10 illustratively for use in a videoconferencing system.

The interactive communication apparatus 10 integrally incorporates an image pickup device 11, a display device 12, microphones 13, and speakers 14. The enclosure of the apparatus 10 also contains codecs and a communication device, not shown.

FIG. 2 is a block diagram showing a typical structure of the interactive communication apparatus 10. In this structure, the image pickup device 11 is constituted by a CMOS image sensor, a CCD image sensor or the like. The image pickup device 11 generates a video signal SVcam representative of a picked-up image and supplies the generated signal to an A/D converter 21. The A/D converter 21 converts the video signal SVcam into a digital video signal DVcam and forwards the converted signal to a video codec 23 as well as to a scaler/OSD (on-screen display) device 24. The video codec 23 encodes (i.e., compresses) the video signal DVcam to generate an encoded transmitter video signal NTv and supplies the generated signal NTv to a communication device 40. The video codec 23 further decodes (decompresses) an encoded receiver video signal NRv coming from the communication device 40 to acquire a video signal DVr and feeds the acquired signal DVr to a capture device 25 and a display driving device 28.

In accordance with a control signal CT coming from the control device 50 (to be described later), the scaler/OSD device 24 scales up or down images based on the video signal DVcam and still pictures held in an image memory device 26 (to be discussed later), and generates images based on text and color information. Also in accordance with the control signal CT from the control signal 50, the scaler/OSD device 24 generates a top screen, an address book screen, various menu screens, and a communication screen on which the other party is displayed in image while communicating, through the use of suitably generated images, images based on the video signal DVcam, still images, and scaled images as needed. Furthermore, the scaler/OSD device 24 supplies the display driving device 28 with a video signal DVm illustratively representing generated menu screens.

The capture device 25 captures the video signal DVr from the video codec 23 to generate a still image signal DVs and feeds the generated signal DVs to the image memory device 26. The image memory device 26 has a capacity large enough to accommodate numerous still image signals including the still image signal DVs supplied from the capture device 25. The image memory device 26 also sends the still image signal DVs from inside to the scaler/OSD device 24.

An input terminal 15 is designed to input images generated by a computer or like equipment (not shown). A video signal DVp input through the input terminal 15 from the computer or the like is forwarded to an input image processing device 27 and to the display driving device 28.

The input image processing device 27 is connected to the communication device 40. The video signal DVp sent through the input terminal 15 to the input image processing device 27 is forwarded to the communication device 40. The input image processing device 27 generates a new video signal DVn based on the video signal DVp coming from the input terminal 15 and on a video signal DVq from the communication device 40, and supplies the generated signal DVn to the display driving device 28.

In accordance with the control signal CT from the control device 50, the display driving device 28 selects at least one of the video signal DVr from the video codec 23, video signal DVm from the scaler/OSD device 24, video signal DVp from the input terminal 15, and video signal DVn from the input image processing device 27. The display driving device 28 proceeds to generate a driving signal DR based on the selected video signal or signals and supply the generated signal DR to the display device 12. Where necessary, the display driving device 28 may scale up or down the image based on the selected video signal. The display device 12 is constituted illustratively by a liquid crystal display, a plasma display panel or a cathode ray tube. Given the driving signal DR, the display device 12 performs display driving operations accordingly to display images under instructions from the control device 50.

The microphones 13 generate an audio signal SAmic and supply it to an A/D converter 31. The A/D converter 31 converts the audio signal SAmic into a digital audio signal DAmic and forwards the digital signal DAmic to an audio codec 33 through an echo canceller 32. The audio codec 33 encodes (i.e., compresses) the supplied audio signal DAmic to generate an encoded transmitter audio signal NTa and supplies the generated signal NTa to the communication device 40. The audio codec 33 further decodes (i.e., decompresses) an encoded receiver audio signal NRa coming from the communication device 40 to acquire an audio signal DAr and forwards the acquired signal DAr to a D/A converter 34 through the echo canceller 32. The D/A converter 34 converts the supplied audio signal DAr into an analog audio signal SAout and sends the analog signal SAout to the speakers 14. The speakers 14 provide audio output based on the audio signal SAout.

The communication device 40 is connected to a network 90. Over the network 90, the communication device 40 sends the signals coming from the video codec 23 and audio codec 33 and the signal from the input image processing device 27 to the desired party's interactive communication apparatus.

The communication device 40 also feeds a self-destined encoded receiver video signal NRv to the video codec 23 and a self-destined encoded receiver audio signal NRa to the audio codec 33.

The control device 50 is connected with an operation input device 51, a memory device 52, and an external memory interface device 53. The operation input device 51 generates an operation signal reflecting the user's operation. The operation input device 51 is illustratively made up of a keyboard, a pointing device (e.g., mouse), and/or a touch panel. The memory device 52 is composed of a rewritable nonvolatile memory and stores information about other parties with whom videoconferences will be held.

FIG. 3 is a tabular view showing the information about communicating parties which is stored in the memory device 52. The communicating party information is illustratively made up of communicating parties' names, access point information, geographical location information, time information, time correction information, information about their storage locations in the image memory device 26 for related still pictures, and layered display information. The communicating party information is equivalent to information in the address book. When a new communicating party is added to the address book or when information about an existing party is modified, the communicating party information is accordingly changed or supplemented with new information.

The parties' names are illustratively composed of users' names, nicknames, or like information that will make individual interactive communication apparatuses readily identifiable. If the interactive communication apparatus is set up for shared use in branches, business offices or departments, the parties' names may be constituted by the names of these branches, offices or departments. Access point information for use in establishing connection with desired communicating parties includes telephones and IP addresses. Geographical location information is used to map the communicating parties to a cartographical plane on a graphic user interface screen, to be described later. As such, the information may be formed by the communicating parties' locality names, longitude and latitude information, or cartographical coordinates. Time information is information about the communicating parties' local times typically indicated as time differences relative to a given standard time. Time correction information is used to display each party's local time correctly by allowing for the so-called summer time or daylight saving time (DST) that may be instituted. If the time to be corrected is one hour added, the time correction information may be limited to a description of the period in which the summer time or DST is practiced. Alternatively, both the summer-time/DST practicing period and the correction time may be described side by side. If the summer-time/DST practicing period is prerecorded, the time to be corrected may be used as the time correction information. Storage location information represents illustratively those locations in the image memory device 26 where still images may be stored for use as the communicating parties' identification images to be displayed on the map. The storage location information may be replaced by party-specific image information that may be used to display the parties' identification images. Layered display information, as will be discussed later, may constitute a layered structure of map displays identifying the communicating parties involved on the graphic user interface screen, each party being associated illustratively with a specific map display in a specific layer or with a particular location on a particular map display. The example of FIG. 3 shows a two-tier entry for each communicating party in the layered display information column. Illustratively, the upper tier indicates a second-layer map display object and its coordinates; the lower tier gives a third-layer map display object and its coordinates. In this example, asterisks merely represent numbers or letters and do not signify they represent the same value each.

The external memory interface device 53 shown in FIG. 2 is designed to connect a recording medium such as a memory card (not shown) with the interactive communication apparatus 10. A specific party's information and still images may be stored beforehand in the recording medium which is then attached to the external memory interface device 53 as needed. Attaching the recording medium to the external memory interface device 53 makes it possible to hold a videoconference privately with a particular party whose information is not stored in the memory device 52. It is also possible to send private still images from the attached recording medium to the desired party. Furthermore, new programs may be placed beforehand in the recording medium. Attaching such a program-loaded recording medium to the external memory interface device 53 provides functional updates or expansions for the interactive communication device 10.

The control device 50 generates the control signal CT using the operation signal PS generated by the operation input device 51, communicating parties' information stored in the memory device 52, and other information held in the recording medium attached to the external memory interface device 53. The control device 5 controls the configured devices of the apparatus by use of the control signal CT thus generated so as to hold a videoconference with a desired parity.

The control device 50 makes use of communicating parties' information that is held in the memory device 52 or stored in the recording medium attached to the external memory interface device 53, as well as still images retained in the image memory device 26. The control device 50 provides a graphic user interface by displaying a graphic user interface screen on the display device 12. More specifically, the GUI screen is displayed by suitably controlling the performance of the scaler/OSD device 24 and display driving device 28, with the operations of and settings on the interactive communication apparatus 10 switched and established in keeping with the operation signal PS coming from the operation input device 51.

Figure 4:
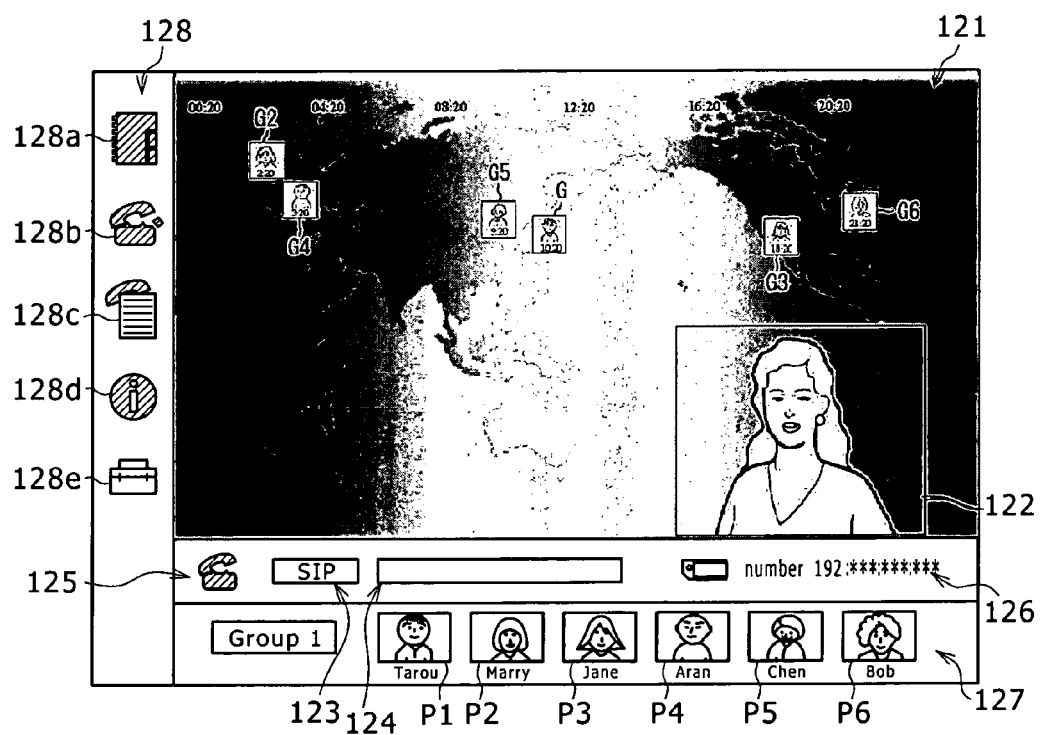
FIG. 4 is a schematic view of a top screen.

What follows is a description of part of the graphic user interface implemented on the interactive communication apparatus 10. FIG. 4 shows a top screen of the graphic user interface appearing on the display device 12 of the interactive communication apparatus 10 (the top screen is displayed on the display device 12 when the interactive communication apparatus 10 is switched on). The top screen may include a map display area 121 in which the communicating parties registered in the address book are mapped onto a suitable cartographical plane.

On the basis of the information about the registered communicating parties, the map display area 121 may have communicating party identification images such as thumbnail images G1 through G6 mapped to cartographical locations representative of the registered communicating parties. The map may be arranged to provide time indications indicating the parties' local times. Preferably, the user of each apparatus may position his or her own location in the middle of the map display area 121. This allows each communicating party to verify the geographical locations and local times of the other communicating parties in clear contrast to his or her location and time zone.

The map display area 121 includes a self-image display area 122 displaying a self-image of the user picked up by the apparatus. If the self-image display area 122 were to be simply superposed onto the map display area 121, the image underneath would be partly concealed. To avoid that obstruction, the scaler/OSD device 24 performs alpha blending using the video signal representing the image shown in the map display area 121 and the video signal representing the image displayed in the self-image display area 122. The process renders the image in the self-image display area 122 semi-transparent when it is displayed onto the map display area 121. The self-image display area 122 can be moved as desired on the screen of the display device 12 in keeping with the operation signal PS.

Under the map display area 121 appear a line type selection area 123, a number input area 124, a dialing button 125, a system status indicator 126, and a one-touch dialing list 127. The line type selection area 123 is used to designate the type of the line for use in holding a videoconference. The number input area 124 is an area in which to enter directly the access point information (e.g., telephone number or IP address) about a communicating party not registered in the address book but desired to be connected for a videoconference. The dialing button 125 is operated to start up connection using the access point information entered in the number input area 124. The system status indicator 126 indicates illustratively information about whether a recording medium is attached to the apparatus. The one-touch dialing list 127 is a list of registered communicating parties with whom a videoconference can be started easily when any one of the entries representing the parties in the list is operated on. The listings in the one-touch dialing list 127 may be changed from one group to another. In the example of FIG. 4, each group is given six display frames P1 through P6, each frame illustratively showing a thumbnail image of a communicating party. The image-based listings in the one-touch dialing list 127 permit the user of the apparatus to select a desired communicating party with ease.

On the left-hand side of the map display area 121 is a function selection area 128. The function selection area 128 displays a selection menu including an address book calling button 128a, a dialing button 128b for starting communication with a party not registered in the address book, an outgoing/incoming call history button 128c for displaying a communication log, an apparatus information display button 128d for displaying apparatus information, and an apparatus set-up button 128e for making settings on the apparatus.

Figure 5:
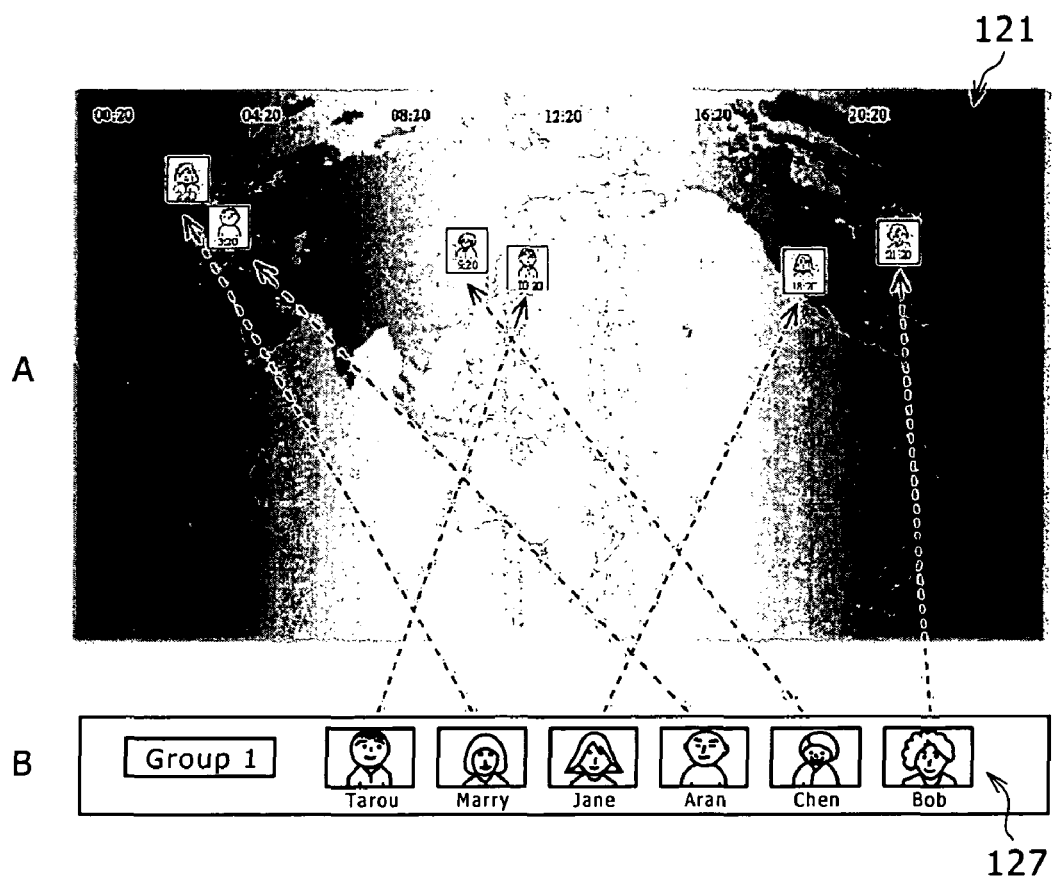
FIGS. 5A and 5B are schematic views showing relations between a map display area and a one-touch dialing list.

FIGS. 5A and 5B are schematic views showing relations between the map display area 121 and the one-touch dialing list 127. In FIGS. 5A and 5B, the self-image display area 122 is omitted.

As illustrated in FIG. 5A, the map display area 121 is displayed in a manner associated with the one-touch dialing list 127. More specifically, the individual identification images representing the communicating parties in the selected group in the one-touch dialing list 127 of FIG. 5B are displayed in the corresponding locations on the map.

It is easy to determine the geographical locations of the communicating-parties in the one-touch dialing list 127 when their identification images are displayed in the corresponding locations on the map. With time indications shown on the map, it is easy to determine the local time of a given communicating party when his or her location is looked up on the map with regard to the time indication nearby. There is no need to search other material for a given communicating party's local time. A glance at the map display area 121 enables the user of the apparatus to know the local time of any communicating party. This makes it possible to avoid setting up a videoconference with a communicating party in a time zone inconvenient for the meeting, whereby the convenience in preparing connections with communicating parties is improved. Preferably, the communicating parties' time-related information constituting part of the communicating party information, such as time information and time correction information, may be included in the time indications corresponding to the parties' identification images. In that case, any given communicating party's local time may be grasped more accurately. Illustratively, of the countries having approximately the same longitude, one country with the summer time (DST) instituted may typically have a one-hour difference to other countries without it. If the time correction information is used to allow for the time difference, then the local time for the communicating party in a summer-time/DST-practicing country is advanced correctly by one hour when indicated by the time indication near that party's identification image.

Preferably, the daytime zone on the map display may be shown bright and the nighttime zone dark. That is, display brightness may be varied depending on the time of day for the distinction between daytime and nighttime for any given locality. Where the 12-hour time display is in place, the brightness-varied display is particularly useful for determining whether a given communicating party is in the daytime or nighttime. Alternatively, it is also possible to vary the colors of display depending on the time of day, with tint and saturation adjusted correspondingly as needed. If tint is desired to be adjusted, red family colors may be used to represent the daytime zone and blue family colors to denote the nighttime zone. Where saturation is desired to be adjusted, the level may be raised for the daytime zone and lowed for the nighttime zone. As another alternative, the brightness, tint and saturation of display may be varied in any desired combination to ensure an easy-to-grasp daytime-nighttime distinction for the user of the apparatus. As a further alternative, the brightness and colors of display may be varied depending on the time of day as well as on the latitude of the geographical location. In this case, different lengths of daytime and nighttime may be indicated in relation to different latitudes.

If the operation input device 51 is operated to focus a mouse pointer or a cursor onto one of the thumbnail images in the one-touch dialing list 127, the map display area 121 may cause the identification image of the communicating party corresponding to the focused thumbnail image to be displayed in a manner distinct from the remaining identification images illustratively in terms of size, color, and/or frame display. Similarly, if the mouse pointer or cursor is focused onto any one of the identification images in the map display area 121, the thumbnail image of the party corresponding to the focused identification image may be displayed in a manner distinct from the other thumbnail images. In this manner, any one display item being focused in contrast with the other items may be highlighted to permit easy verification of a given communicating party's geographical location and local time. In other words, simply focusing on one of the thumbnail images in the one-touch dialing list 127 allows the user of the apparatus to grasp easily the geographical location and local time of the focused communicating party. Conversely, focusing on one of the identification images in the map display area 121 causes the one-touch dialing list 127 to show distinctly which communicating party is being focused. The thumbnail-based highlighting in the one-touch dialing list 127 is useful for knowing the focused party particularly when the identification images in the map display area 121 are too small to indicate clearly whom they represent.

In FIGS. 5A and 5B, the communicating parties in the one-touch dialing list 127 are shown displayed in the map display area 121. Alternatively, the map display area 121 may display the identification images of all registered communicating parties in their corresponding locations on the map. For example, a group designation frame in the one-touch dialing list 127 may be arranged to include an item for selecting all groups. When that item is selected, the identification images of all parties registered in each group will be displayed in the corresponding locations on the map.

Meanwhile, if there are a large number of identification images to be displayed or if a plurality of communicating parties are displayed in approximately the same location, there will be overlapping identification images making it difficult for the user of the apparatus to tell one image from another. In such cases where numerous communicating parties are registered or where a plurality of parties are stationed in approximately the same geographical location, identification images may be grouped on an easy-to-grasp display.

Figure 6A:
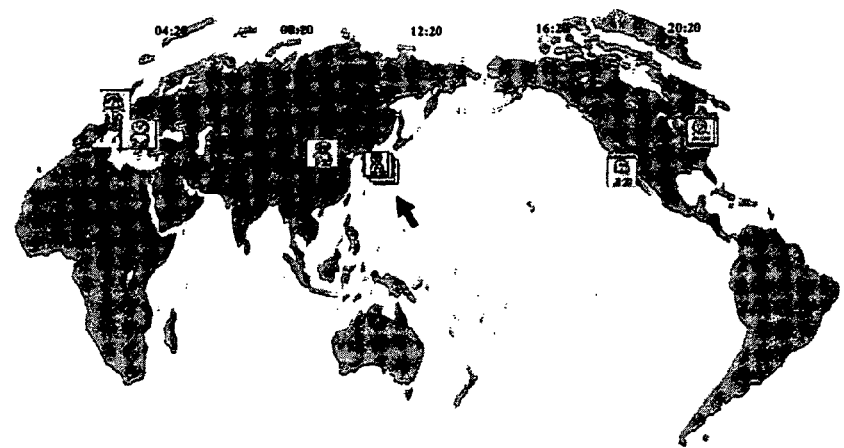
FIGS. 6A and 6B are schematic views showing grouped displays.
Figure 6B:
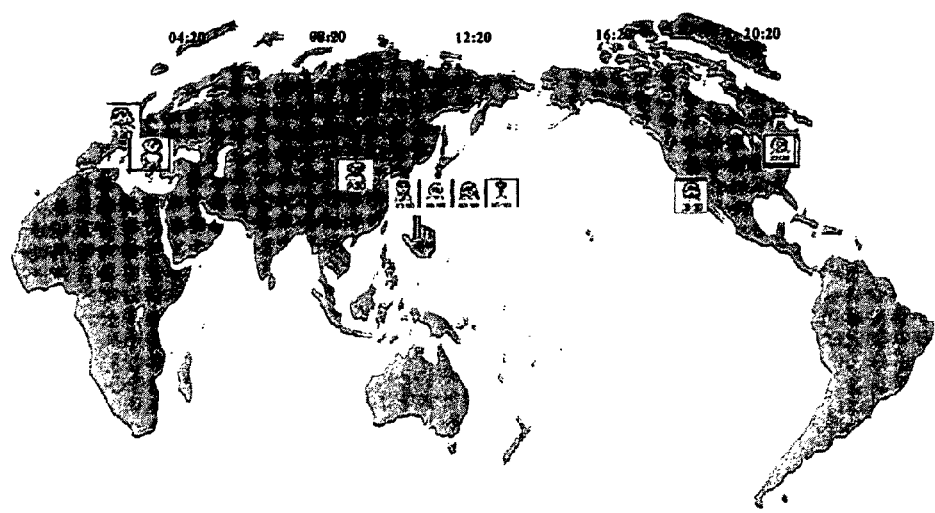

FIGS. 6A and 6B are schematic views showing how identification images are grouped when displayed. Where the grouped display arrangement is in effect, the identification images belonging to the same geographical area or the same country on the map are displayed in imbricate fashion as shown in FIG. 6A. The imbricate display clearly indicates the presence of a plurality of identification images. The overlapping image display does not reveal what lies beneath the top image. The identification images underneath are verified individually when laid out side by side by the user focusing the mouse pointer or cursor onto the overlapping images, as shown in FIG. 6B. Alternatively, with an imbricate image display being focused, a suitable operation signal PS may be issued by the operation input device 51 to cyclically move the overlapping images from one layer to the next; the image coming on top is moved to the bottom next. This also allows the user to check the overlapping identification images individually.

In the map display area 121, a structure of layered graphic user interface screens may be established, with each screen having a different map scale. With this arrangement in effect, from among a large number of registered communicating parties, the desired party may be looked up efficiently by displaying a map of a suitable scale. The layered display information about the communicating parties shown in FIG. 3 are used to set the graphic user interface in such a layered structure.

Described below is an example in which the graphic user interface is composed of three layers. The first layer represents a world map display. The second layer involves having the world map divided into a plurality of regions such as Europe, North America and East Asia, each region being displayed on a larger scale than on the world map. The third layer has each region in the second layer further divided into a plurality of areas, each area being displayed on a still larger scale than on the regional map.

Where the graphic user interface is structured as described, the layered display information may be constituted illustratively by two kinds of information listed in two tiers as explained earlier: information indicating second-layer display locations, and information representing third-layer display locations.

Figure 7:
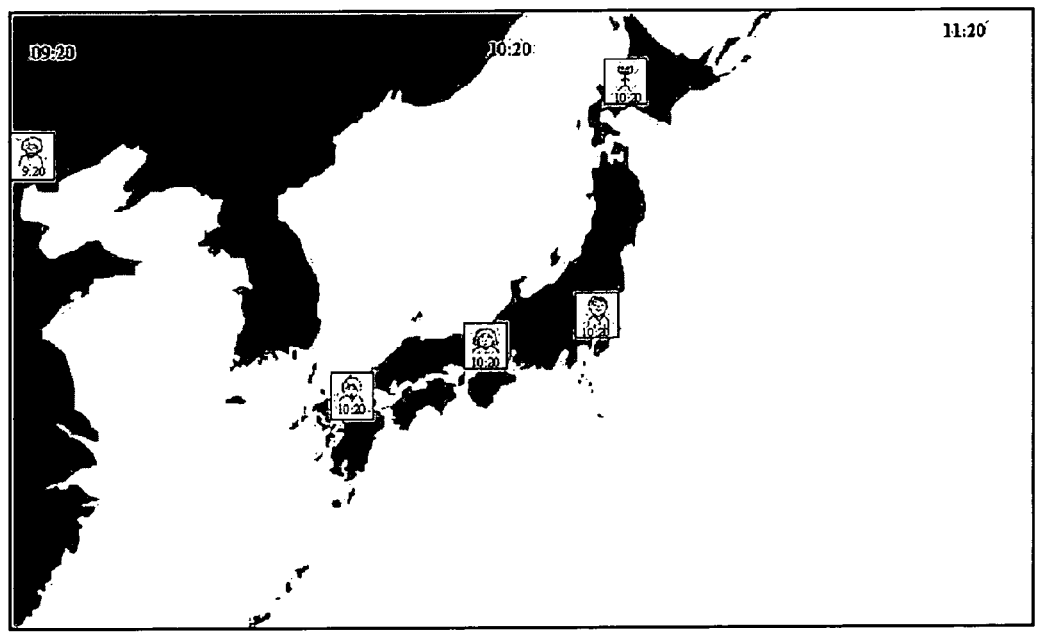
FIG. 7 is a schematic view showing a scaled-up display.

Suppose now that East Asia is selected from the world map in FIG. 4 or in FIG. 6A or 6B. In that case, a scaled-up map showing the East Asia region is displayed as indicated in FIG. 7. In the layered display information listed, an upper-tier entry is used to select the communicating party on the suitable map display (denoted illustratively by "ASE" representing the selected East Asia region). The identification image of the communicating party in question is displayed in the relevant location indicated by the layered display information.

As described, the graphic user interface screen may be structured using layered maps that can be switched, each map having a different scale. This screen structure makes it possible efficiently to search for and look up a desired party from among numerous registered communicating parties. Because the local time of any given party is easy to verify, the convenience in establishing connection with the desired party for a videoconference is enhanced. Where the map scales are changed for display or where the maps of different regions are switched for display, the appropriate display location for any given party's identification image on the selected map may be calculated using the party's latitude and longitude information. However, registering the layered display information in advance makes it possible to display the identification image of a desired communicating party in the relevant location on the map without performing calculations based on latitude and longitude information.

The display layers may be switched by having the operation signal PS supplied from the operation input device 51. Alternatively, a menu display including a layer-by-layer switchover may be called up. In this case, the displayed menu may be operated on to issue an operation signal PS indicating that the layer-by-layer switchover has been selected, whereby the display layers are switched.

What follows is a description of how the interactive communication apparatus 10 is typically operated. On the top screen of FIG. 4, the display frames P1 through P6 in the one-touch dialing list 127 show no still images in the initiate state. Illustratively, there are two ways to get still images displayed in the display frames P1 through P6, as will be explained below. In the description that follows, getting a new still image displayed in any one of the display frames P1 through P6 will be called the one-touch dialing registration.

From the top screen, the one-touch dialing registration is carried out as follows. On the interactive communication apparatus 10, connection with the desired party for a videoconference is established in one of two ways: the party's access point information is first entered in the number input area 124 and then the icon of the dialing button 125 is clicked on; or the address book calling button 128a is first clicked to open the address book screen and the desired party is selected on that screen for establishing connection with that party.

During the videoconference following the above procedure for connecting with the communicating party over the network 90, or immediately after ending the connection, the user may call up the top screen and select an unused one of the display frames P1 through P6 in which a still image has yet to be displayed in the one-touch dialing list 127. At this point, the control device 50 of the interactive communication apparatus 10 causes the scaler/OSD device 24 to generate a sub-menu screen regarding one-touch dialing and further causes the display device 12 to display on its screen a sub-menu for the one-touch dialing registration. On this sub-menu, the user of the apparatus may set the information about the communicating party to be registered for one-touch dialing. A thumbnail image of the communicating party is captured by the picture device 25 in a suitably timed manner from the party's image being displayed on the display device 12 during the videoconference. The captured still image is stored into the image memory device 26. The storage location of the still image placed into the image memory device 26 is registered in the communicating party information. This enables the still picture held in the image memory device 26 to be registered as the thumbnail image of the communicating party in question.

The control device 50 proceeds to store the party's communicating party information in association with the current group number and with the display frame P1 in the one-touch dialing list 127 on the top screen. This completes the one-touch dialing registration of the communicating party of interest.

When the top screen is subsequently displayed again, the control device 50 retrieves the still picture of the communicating party from the image memory device 26 in accordance with the communicating party information, and causes the scaler/OSD device 26 to compress the retrieved image before getting the image displayed in the display frame P1 for group No. 1 in the one-touch dialing list 127. The control device 50 further causes the scaler/OSD device 24 to generate character data denoting the party's name so as to display the party's name alongside the display frame P1 for group No. 1.

Alternatively, the registration into the one-touch dialing list 127 may be carried out using address book information. The procedure involves utilizing a given party's still picture captured in the past by the capture device 25 and stored into the image memory device 26 during a videoconference with that party.

Where a given communicating party has already been registered, that party's identification image is displayed in the map display area 121 as discussed above.

Figure 8:
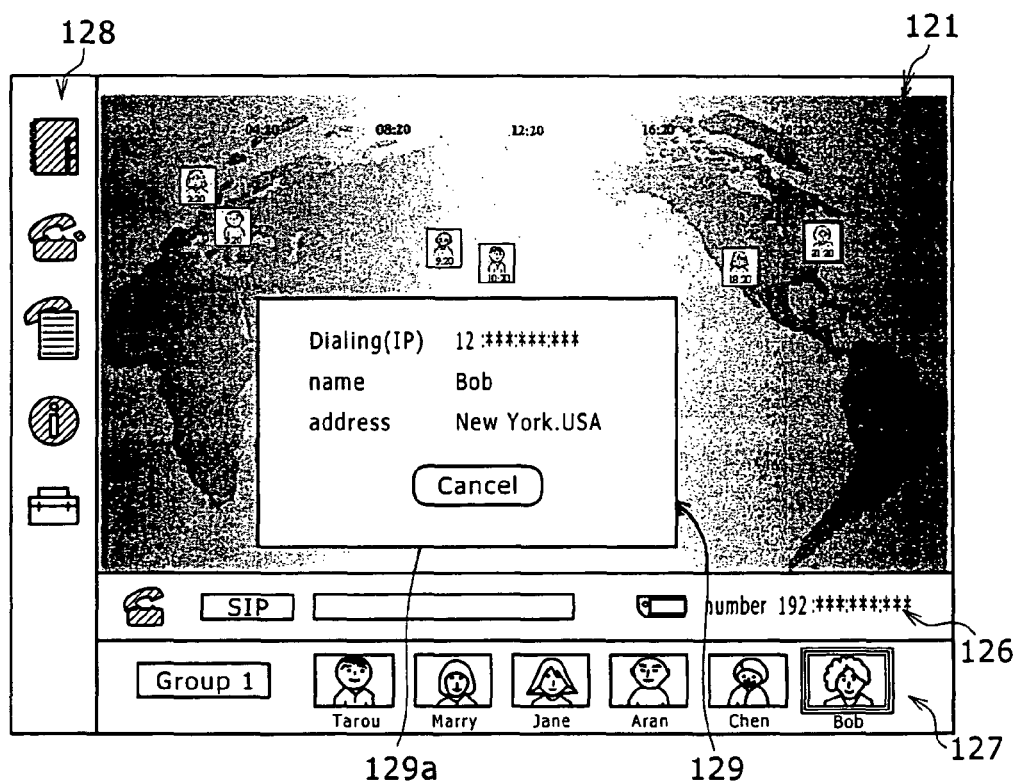
FIG. 8 is a schematic view showing a transmission pop-up image.

When holding a videoconference with a given party, the user of the apparatus first moves the mouse pointer or cursor to focus on the identification image of the party in question in the map display area 121. The user then performs operations to start the videoconference with the communicating party whose identification image is being focused. This prompts the apparatus to start the communication using the access point information about the party in question. During the communication starting process, a transmission pop-up image 129 is displayed on the screen as shown in FIG. 8. The transmission pop-up image 129 displays the communicating party's name, geographical location information, and dialing information (i.e., access point information). Later, when connection is established with the communicating party, the videoconference may be started while the other party's image alone or both the other party's image and the user's self-image are being displayed on the display device screen. The transmission pop-up image 129 includes a cancel button 129a. Selecting the cancel button 129a forcibly terminates the ongoing communication starting process.

In the foregoing description, the videoconference was shown to be held with a registered party. A videoconference with an unregistered party may also be initiated using what is displayed in the map display area 121. More specifically, access point information about the unregistered party may be entered in the number input area 124. When the access point information is entered, the country of the communicating party involved is determined on the basis of the country code in the input telephone number or of the entered IP address. Given the result of the determination, an identification image is displayed on the world map in the map display area 121 in such a manner as to identify the country to which the party in question is found to belong. With the country identification image displayed in the map display area 121 based on the entered access point information, it is possible to know the local time of the unregistered communicating party before starting communication. This is another feature contributing to enhancing the convenience in establishing connection with any given communicating party.

In the foregoing description, just one party was shown to be selected from the map display area 121 or from the one-touch dialing list 127 for establishing connection. Alternatively, a plurality of communicating parties may be selected (i.e., multipoint connection) for a videoconference. In such a case, two or more desired parties may be selected one after another from the map display area 121 or one-touch dialing list 127 for a multi-party videoconference.

In the past, the videoconference based on a multipoint connection involved opening the address book and selecting desired parties from numerous registered parties. It took time to look up all desired parties in this manner. It was also a time-consuming exercise to check whether the local time of each communicating party was convenient for a videoconference. By contrast, the inventive interactive communication apparatus 10 allows the user to check easily the local time of each party for a multipoint videoconference. Connection with each communication party can be readily established after the local times of the parties involved are properly checked for their convenience.

Although the description above contains many specificities, these should not be construed as limiting the scope of the invention but as merely providing illustrations of the presently preferred embodiments of this invention. It is to be understood that changes and variations may be made without departing from the spirit or scope of the claims that follow. For example, the above-described structure and display layout of the graphic user interface screen and the number of display frames in the one-touch dialing list 127 are mere examples and not limitative of the invention. Furthermore, although the interactive communication apparatus 10 was shown to incorporate the display device, image pickup device, microphones, speakers, codecs, and communication device integrally, this is not limitative of the invention. Alternatively, the embodiment of the invention can be practiced profitably by having these component devices set up in separate fashion.

It should be understood by those skilled in the art that various modifications, combinations, sub-combinations and alterations may occur depending on design requirements and other factors insofar as they are within the scope of the appended claims or the equivalents thereof.

What is claimed is:

1. An interactive communication apparatus for having a video signal obtained by an image pickup device performing an image pickup activity and for having the obtained video signal sent to another apparatus through a communication device while causing a display device to display an image based on a video signal received from said another apparatus through said communication device, said interactive communication apparatus comprising:
   a storage device configured to store communicating party information about a communicating party at said another apparatus, said communicating party information including geographical location information and access point information about said communicating party; and
   a graphic user interface configured to generate a graphic user interface screen in order to have said display device display the generated screen by mapping an identification image identifying said communicating party onto a map based on said communicating party information in such a manner as to indicate a local time applicable to said communicating party.

2. The interactive communication apparatus according to claim 1, wherein
   said communicating party information includes information about said local time of said communicating party, and
   said graphic user interface causes said local time of said communicating party to be included in said identification image.

3. The interactive communication apparatus according to claim 1, wherein said graphic user interface displays time information onto said map and varies display brightness and/or display colors on said map depending on said time information.

4. The interactive communication apparatus according to claim 1, wherein said graphic user interface provides a layered structure of graphic user interface screens each having a different scale of said map.

5. The interactive communication apparatus according to claim 1, wherein if said identification image mapped on said map is selected, then said graphic user interface starts communication using said access point information about said communicating party corresponding to the selected identification image.

6. A connecting method for use with an interactive communication apparatus which has a video signal obtained by an image pickup device performing an image pickup activity and which has the obtained video signal sent to another apparatus through a communication device while causing a display device to display an image based on a video signal received from said another apparatus through said communication device, said interactive communication apparatus including a graphic user interface and a storage device configured to store communicating party information about a communicating party at said another apparatus, said communicating party information including geographical location and access point information about said communicating party, said connecting method causing said graphic user interface to carry out a procedure comprising:

generating a graphic user interface screen in order to have said display device display the generated screen by mapping an identification image identifying said communicating party onto a map based on said communicating party information in such a manner as to indicate a local time applicable to said communicating party; and starting communication using said access point information about said communicating party corresponding to a selected identification image, if said identification image mapped on said map is selected.

7. An interactive communication apparatus for having a video signal obtained by an image pickup device performing an image pickup activity and for having the obtained video signal sent to another apparatus through a communication device while causing a display device to display an image based on a video signal received from said another apparatus through said communication device, said interactive communication apparatus comprising:

a storage means for storing communicating party information about a communicating party at said another apparatus, said communicating party information including geographical location information and access point information about said communicating party; and a graphic user interface means for generating a graphic user interface screen in order to have said display device display the generated screen by mapping an identification image identifying said communicating party onto a map based on said communicating party information to indicate a local time applicable to said communicating party.

8. The interactive communication apparatus according to claim 1, further comprising:

an input terminal configured to input images.

9. The interactive communication apparatus according to claim 1, wherein the communicating party information further includes name information, time information, time correction information, information about a storage location in an image memory device for related still pictures, and layered display information about said communicating party.

10. The interactive communication apparatus according to claim 1, wherein the identification image identifying said communicating party mapped onto the map is semitransparent.

11. The interactive communication apparatus according to claim 1, wherein the graphic user interface screen includes at least one of:
a line type selection area for designating a type of line to be used for a videoconference;
a number input area for directly entering the access point information about a communicating party to be connected for a videoconference;
a dialing button for connecting to the communicating party whose access point information was entered in the number input area;
a system status indicator indicating whether a recording medium is attached to the interactive communication apparatus; and
a one-touch dialing list comprising communicating parties.

12. The interactive communication apparatus according to claim 11, wherein the one-touch dialing list comprises thumbnail images of the communicating parties.

13. The interactive communication apparatus according to claim 12, wherein an identification image identifying a communicating party is displayed in a manner distinct from the identification images of other communicating parties when a mouse pointer or a cursor focuses on a thumbnail image associated with the identification image identifying the communicating party.

14. The interactive communication apparatus according to claim 12, wherein the thumbnail image of one of the communicating parties is displayed in a manner distinct from the thumbnail images of other communicating parties when a mouse pointer or a cursor focuses on an identification image associated with the thumbnail image.

15. The interactive communication apparatus according to claim 1, wherein the graphic user interface screen further includes a function selection area that displays a selection menu including an address book calling button, a dialing button for starting communication with a communicating party not registered in an address book, an outgoing/incoming call history button for displaying a communication log, an apparatus information display button for displaying information about the interactive communication apparatus, and an apparatus set-up button for making settings on the interactive communication apparatus.

16. The interactive communication apparatus according to claim 1, wherein the identification image identifying the communicating party is mapped onto the map at an area of the map based on the geographical location information about the communicating party.

* * * * *